June 1, 1965 A. D. EITZEN 3,186,137

METHOD AND APPARATUS FOR THE PRODUCTION OF BEVERAGE TAPE

Filed Sept. 21, 1960 13 Sheets-Sheet 1

INVENTOR
AUGUST D. EITZEN

Symmestvedt & Lechner
ATTORNEYS

INVENTOR
AUGUST D. EITZEN

Synnestvedt + Lechner
ATTORNEYS

June 1, 1965 A. D. EITZEN 3,186,137

METHOD AND APPARATUS FOR THE PRODUCTION OF BEVERAGE TAPE

Filed Sept. 21, 1960 13 Sheets-Sheet 3

INVENTOR
AUGUST D. EITZEN

Synnestvedt & Lechner
ATTORNEYS

METHOD AND APPARATUS FOR THE PRODUCTION OF BEVERAGE TAPE

Filed Sept. 21, 1960

13 Sheets-Sheet 4

INVENTOR
AUGUST D. EITZEN

Symmestvedt & Lechner
ATTORNEYS

INVENTOR
AUGUST D. EITZEN
Synnestvedt & Lechner
ATTORNEYS

METHOD AND APPARATUS FOR THE PRODUCTION OF BEVERAGE TAPE

Filed Sept. 21, 1960

INVENTOR
AUGUST D. EITZEN

Synnestvedt & Lechner
ATTORNEYS

June 1, 1965 A. D. EITZEN 3,186,137

METHOD AND APPARATUS FOR THE PRODUCTION OF BEVERAGE TAPE

Filed Sept. 21, 1960 13 Sheets-Sheet 7

INVENTOR
AUGUST D. EITZEN

Symmestvedt & Lechner
ATTORNEYS

June 1, 1965 A. D. EITZEN 3,186,137

METHOD AND APPARATUS FOR THE PRODUCTION OF BEVERAGE TAPE

Filed Sept. 21, 1960 13 Sheets-Sheet 8

INVENTOR
AUGUST D. EITZEN

Synnestvedt & Lechner
ATTORNEYS

METHOD AND APPARATUS FOR THE PRODUCTION OF BEVERAGE TAPE

Filed Sept. 21, 1960 13 Sheets-Sheet 9

INVENTOR
AUGUST D. EITZEN

Symmetwedt & Lechner
ATTORNEYS

June 1, 1965 A. D. EITZEN 3,186,137

METHOD AND APPARATUS FOR THE PRODUCTION OF BEVERAGE TAPE

Filed Sept. 21, 1960 13 Sheets-Sheet 10

INVENTOR
AUGUST D. EITZEN

Synnestvedt & Lechner
ATTORNEYS

METHOD AND APPARATUS FOR THE PRODUCTION OF BEVERAGE TAPE

Filed Sept. 21, 1960 13 Sheets-Sheet 11

INVENTOR
AUGUST D. EITZEN

Synnestvedt & Lechner
ATTORNEYS

INVENTOR
AUGUST D. EITZEN
Synnestvedt & Lechner
ATTORNEYS

June 1, 1965 A. D. EITZEN 3,186,137

METHOD AND APPARATUS FOR THE PRODUCTION OF BEVERAGE TAPE

Filed Sept. 21, 1960

13 Sheets-Sheet 13

INVENTOR
AUGUST D. EITZEN

Symmestvedt & Lechner
ATTORNEYS

United States Patent Office 3,186,137

Patented June 1, 1965

3,186,137
METHOD AND APPARATUS FOR THE PRODUCTION OF BEVERAGE TAPE

August D. Eitzen, Rockville Centre, N.Y., assignor to Rudd-Melikian, Inc., Hatboro, Pa., a corporation of Pennsylvania Filed Sept. 21, 1960, Ser. No. 57,495
10 Claims. (Cl. 53—24)

This invention relates to the production of continuous tapes carrying extractable commodities, e.g., ground coffee, tea leaves, and other solids from which beverages may be produced.

The invention is particularly concerned with a novel automatic machine for producing tapes carrying commodities in discrete masses adapted for use in automatic extraction machines, for example, automatic coffee brewing machines.

The invention is also concerned with a method for producing such tapes and with the novel tape produced by the machine and method.

A coffee brewing machine of the type above referred to is disclosed in copending application of Zimmerman and Davis, Serial No. 771,132, filed October 31, 1958, now Patent No. 3,078,576. Such a vending machine operates upon a coffee tape comprising two layers of water permeable material, such as paper, between which and spaced along the tape are discrete masses of ground coffee, which masses can be centered in the brewing machine by means of indexing holes in the tape which cooperate with indexing pins in the machine.

It is a primary object of the invention to produce automatically tapes of the kind just described.

The machine of the invention comprises a reservoir of ground coffee, two runs of water-permeable paper, mechanism for forming a series of dimples in one run of paper, for feeding a measured charge of ground coffee to each such dimple, for briquetting the charge of coffee deposited in the dimple, for juxtaposing the second run of paper to the first over the briquetted charges of coffee, for sealing the second run of paper to the first in a circumferential zone surrounding each briquette of coffee to form a pod, and for producing indexing holes in the tape in fixed and predetermined relationship to the pods.

Among the more specific objects of the invention are:

The provision of accurate control of the flow of coffee and of paper; control of the distribution of coffee in the briquette forming each pod; accurate location of the pods with respect to the margin of the paper, and with respect to each other; and accurate location of the indexing holes with respect to the pods.

Still further, the invention has the purpose of providing a coffee tape which when used in an automatic brewing machine will make it possible to extract the maximum amounts of flavor constituents from the coffee pod in the minimum time. The achievement of this objective requires that the coffee grounds in the pod be arranged in a homogeneous mass so that the extracting fluid in the brewing machine will not find channels of low coffee ground concentration and thereby bypass a portion of the coffee grounds.

However the foregoing objectives and other objects and advantages of the invention are attained will be understood more clearly upon reference to the description contained hereinbelow and to the drawings.

Figure 28:
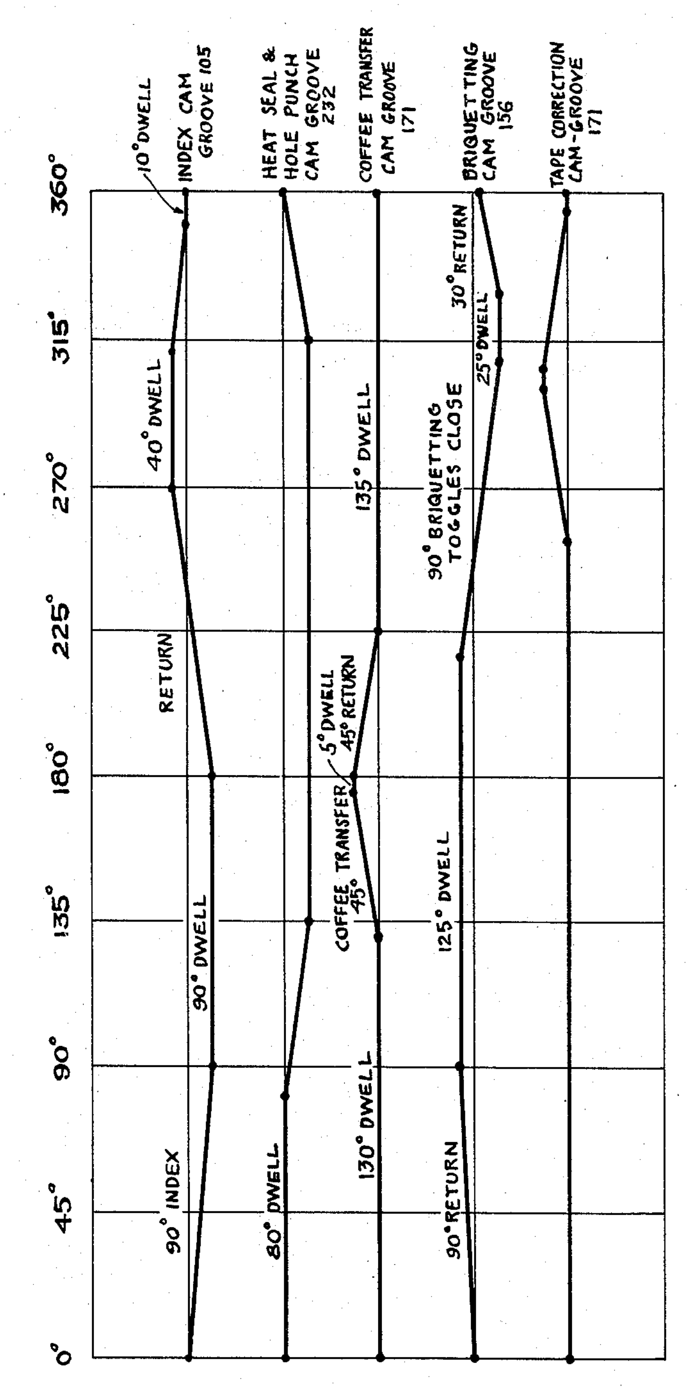
Figures 29, 30:
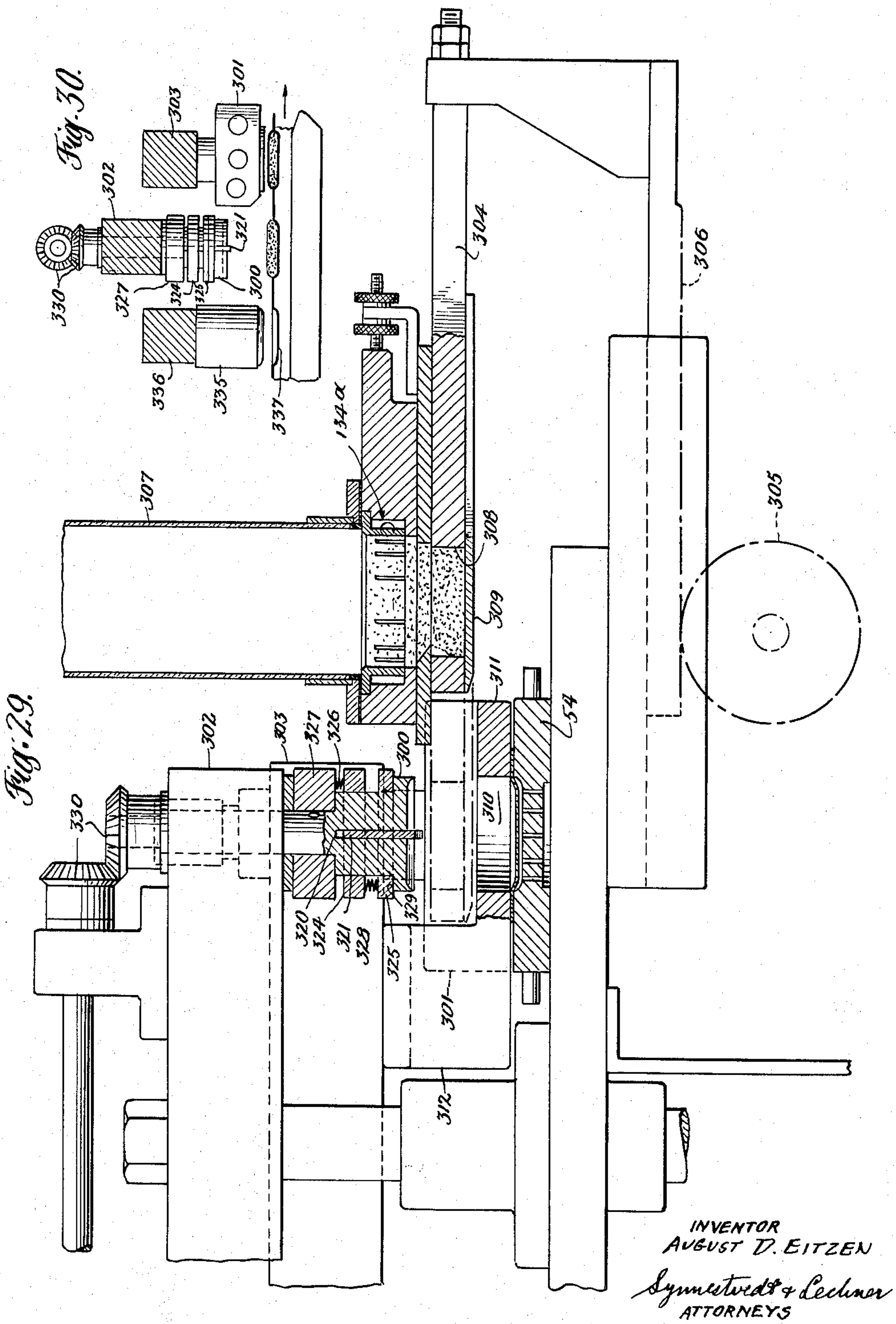
Figure 31:
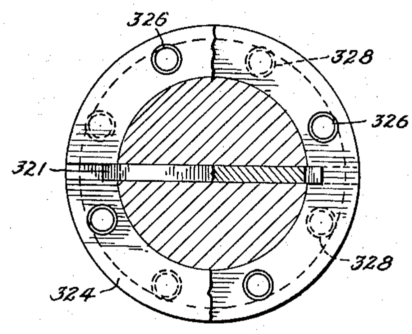

FIGURES 22 to 27, inclusive, are diagrammatic views illustrating the sequence of operation of the commodity transfer and briquetting mechanism;

FIGURE 28 is a chart illustrating the sequence of operations controlled by the timing cams;

FIGURE 29 is a sectional elevational view illustrating commodity leveling mechanism which may be used in the machine of the invention;

FIGURE 30 is a diagrammatic view illustrating on a smaller scale than that of FIGURE 29 the sequential operation of the dimpling plunger and the leveling and briquetting mechanism of FIGURE 29, and of the heat sealing mechanism;

FIGURE 31 is a plan section on the line 31—31 of

Figure 34:
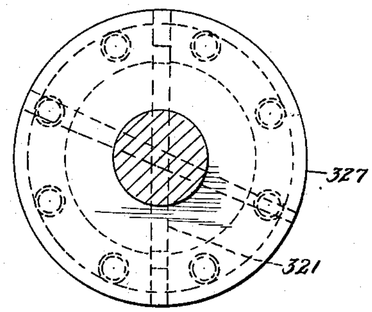
Figure 32:
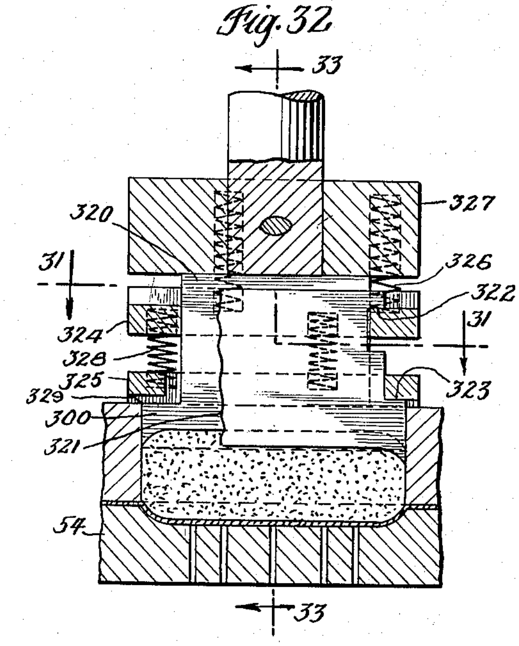
Figure 33:
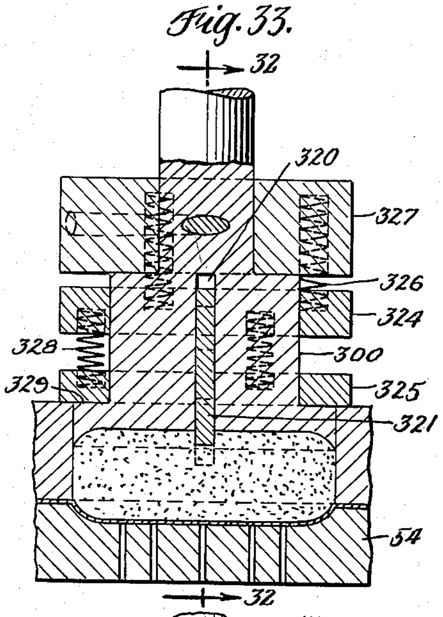
Figure 35:
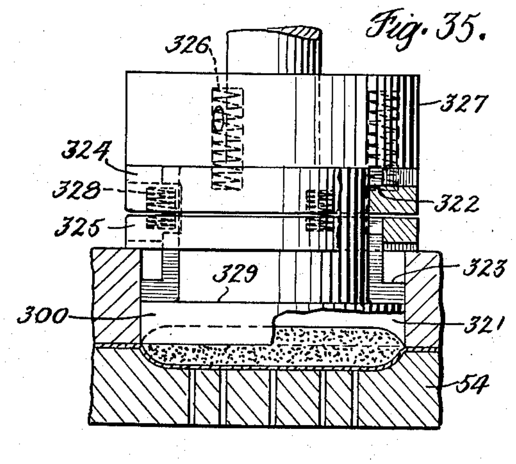
Figure 36:
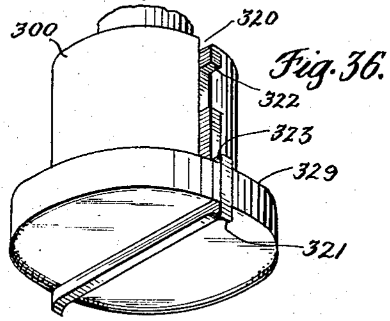

FIGURE 32 illustrating the leveling and briquetting punch of FIGURE 29;

FIGURE 32 is a cross sectional view taken on the line 32—32 of FIGURE 33;

FIGURE 33 is a cross sectional view taken on the line 33—33 of FIGURE 32;

FIGURE 34 is a plan view of the structure of FIGURE 33;

FIGURE 35 illustrates the briquetting plunger and leveling blade of FIGURE 32 in the briquetting position; and FIGURE 36 is an isometric view of the briquetting plunger and leveling blade.

Figure 1:
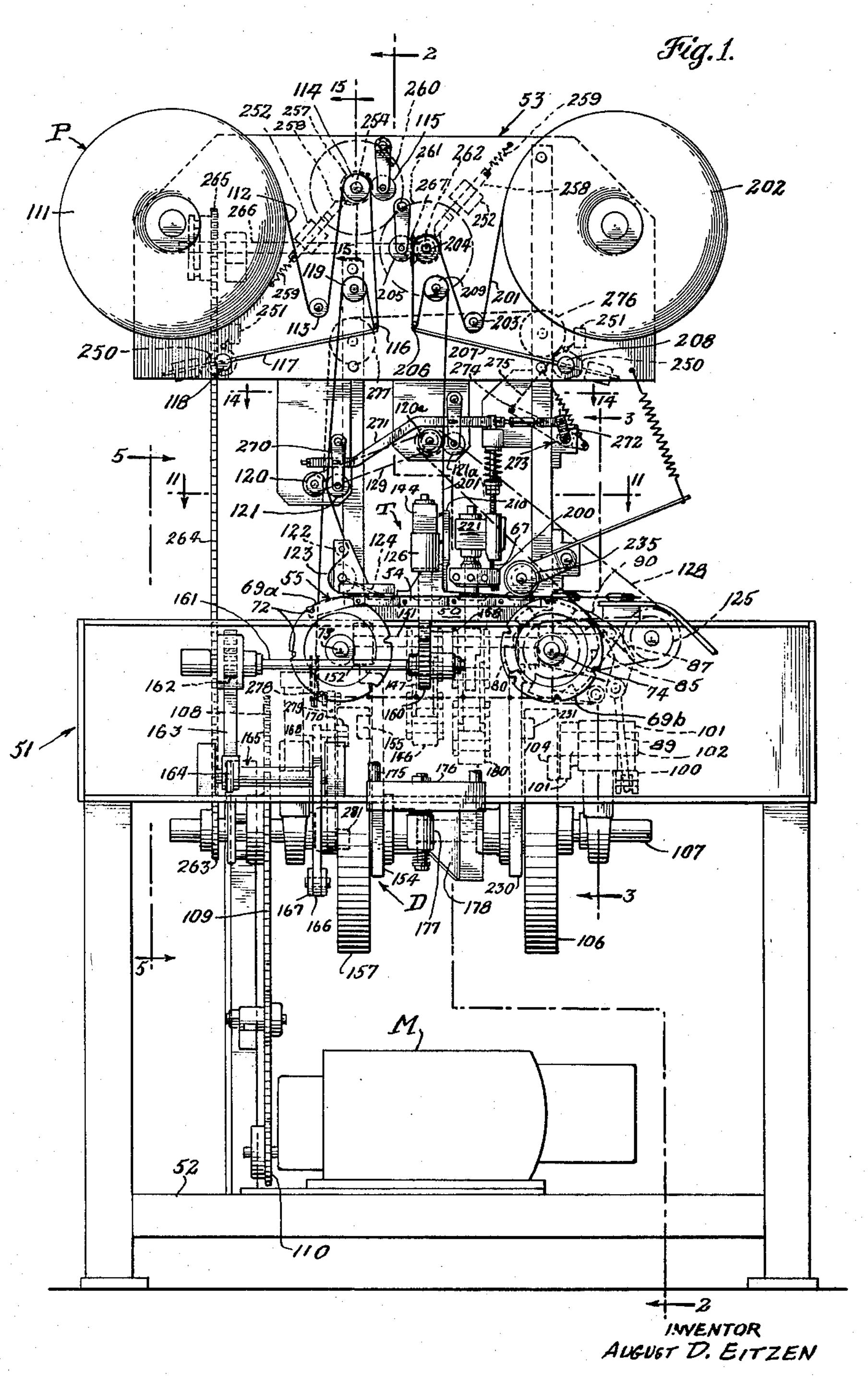
FIGURE 1 is an elevational view of a machine constructed in accordance with the invention, illustrating a side of the machine which for convenience will be designated as the right side of the machine.
Figure 2:
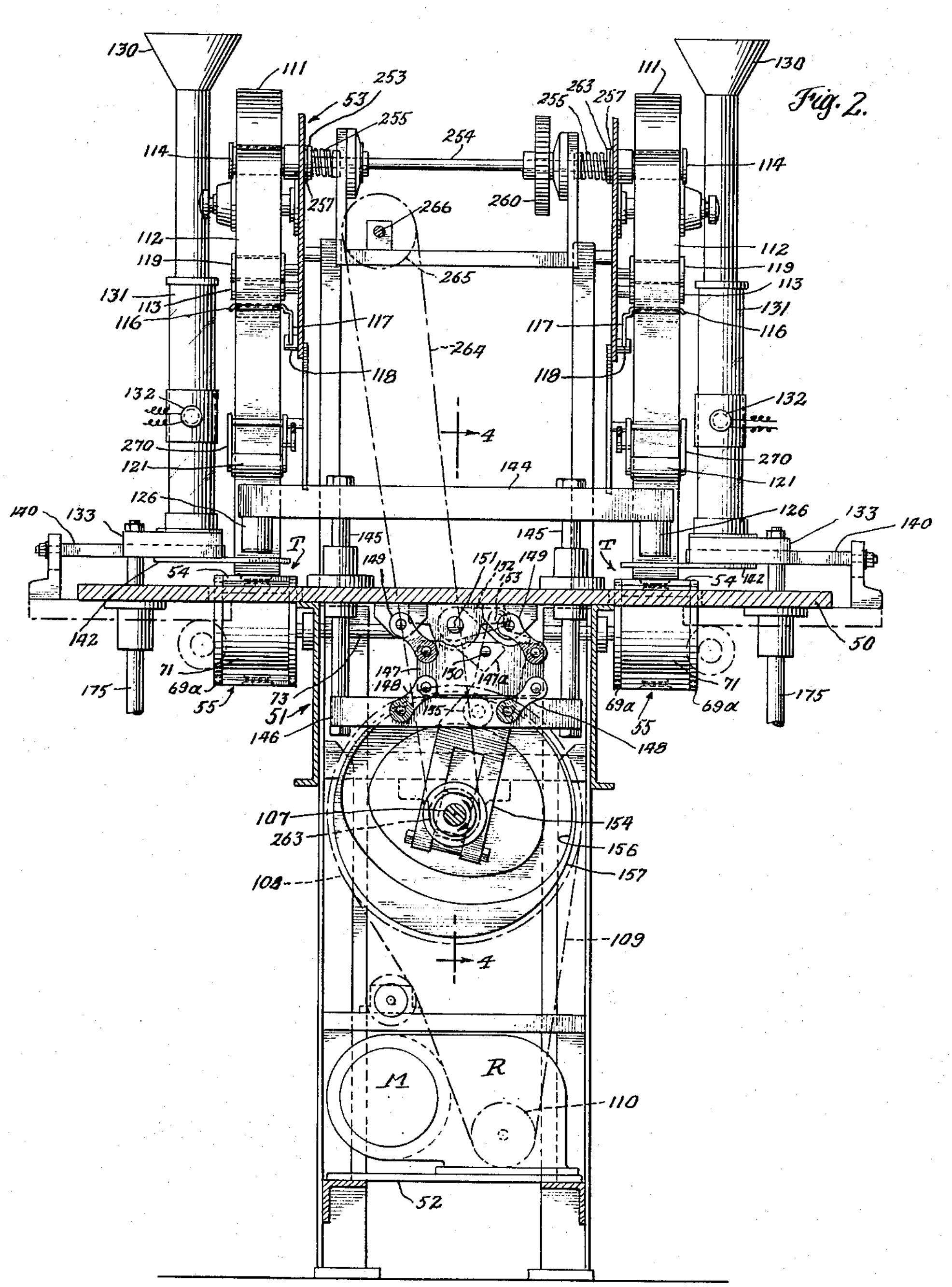
FIGURE 2 is a sectional elevational view facing the back of the machine, taken approximately from the line 2—2 of FIGURE 1, and illustrating the table arrangement of the machine and the toggle mechanism for actuating the briquetting plungers.

The overall organization of the machine of the invention can best be seen in FIGURES 1 and 2. As illustrated there the machine comprises a table 50 generally supported on framework 51 which also supports a shelf 52 and a superstructure generally indicated at 53.

In general, the primary drive mechanism including a motor M and reduction gear mechanism R are mounted on the shelf 52, the actual tape forming mechanism T is located on table 50, and the driving and timing mechanism D is located just under table 50.

The machine illustrated in the drawings comprises a single driving and timing mechanism, and dual paper feed, dual coffee feed, and dual tape forming mechanism, as may be seen most clearly in FIGURE 2.

The tape is actually formed on a series of moving tables 54 which are flexibly interconnected to form a continuous conveyor chain, two chains 55 being employed in the machine.

Figures 17, 18:
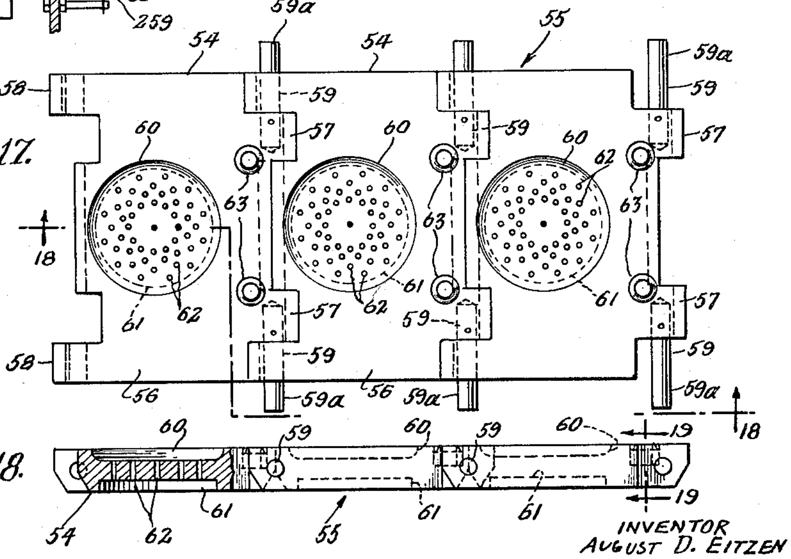
FIGURE 17 is a fragmentary plan view of three of the links of the conveyor mechanism.
FIGURE 18 is a sectional elevational view taken on the line 18—18 of FIGURE 17.

The location of the runs of chain 55 may be seen in FIG. 1. The construction of chain 55 may best be understood upon reference to FIGS. 17 and 18.

Each movable table member 54 (see FIGS. 17 and 18) comprises a plate 56 provided with hinge ears 57—57 and 58—58 by means of which, together with hinge pins 59, each member 54 is hingably interconnected with the next.

Each member 54 is provided with a pocket 60 in its upper surface whose size and shape determines the size and shape of the coffee pod to be formed on the tape.

Each member 54 is also provided with a recess 61 in its lower surface which underlies the pocket 60 and with which it is in communication by means of bores 62.

Figure 19:
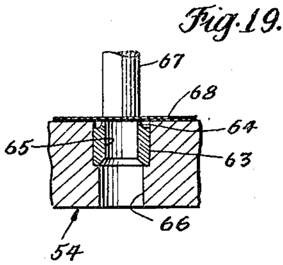
FIGURE 19 is an enlarged fragmentary sectional view taken on the line 19—19 of FIGURE 18 and illustrating the punch for producing indexing holes in the tape.

Each member 54 is also provided with two punch dies 63, the details of which are illustrated in FIG. 19. Each die 63 is of hollow cylindrical form and is provided with a circumferential cutting edge 64 alined with the internal cylindrical surface of the die. The internal bore 65 of the die is in communication with a bore 66 in plate 56. Die 63 cooperates with a punch anvil 67 which is actuated in timed relationship to other operations of the mechanism to force tape 68 (see FIG. 19) against the cutting edge 64 of die 63. The punched out paper is removed through bores 65 and 66 by means of a vacuum connection described below.

Each chain 55 is mounted in a continuous run and passes over a pair of double sprocekts 69. Each sprocket 69 comprises a pair of end plates 70 and a barrel 71. End plates 70 are provided with notches 72 adapted to receive and drivingly engage outer ends **59*a* of hinge pins 59**.

As viewed in FIG. 1, sprockets **69*a* are mounted on a shaft 73 and function as idlers. Sprockets 69*b*—at the right in FIG. 1—are mounted on a shaft 74 which shaft is driven by a ratchet mechanism illustrated in FIGURES 6 through 10. The ratchet mechanism is arranged to provide for both the driving of conveyor chain 55 and for the accurate positioning and indexing of members 54 at the successive stations of tape assembly. It is therefore constructed and arranged to advance conveyor chain 55** by a precisely determined distance and then to stop the conveyor chain and maintain it in such position for a precisely determined length of time.

The ratchet mechanism comprises a ratchet wheel 80 keyed to shaft 74 by a key 81. Ratchet wheel 80 is provided with teeth 82, each of which is configured to include a driving face 83 and a locking face 84. Ratchet wheel 80 is driven by a pawl 85 which is mounted for oscillation on a pivot 86 which is in turn supported by a bracket 87 mounted for oscillation on the shaft 74. Pawl 85 is urged toward ratchet wheel 80 by a spring plunger 88 (see FIG. 6) mounted in bracket 87. The driving force is communicated to pawl 85 through bracket 87 by means of a connecting rod 89 which in turn is driven by driving and timing mechanism to be described presently. For the present it is sufficient to say that connecting rod 89 is periodically pulled downwardly as viewed in FIG. 6.

Figures 8, 9:
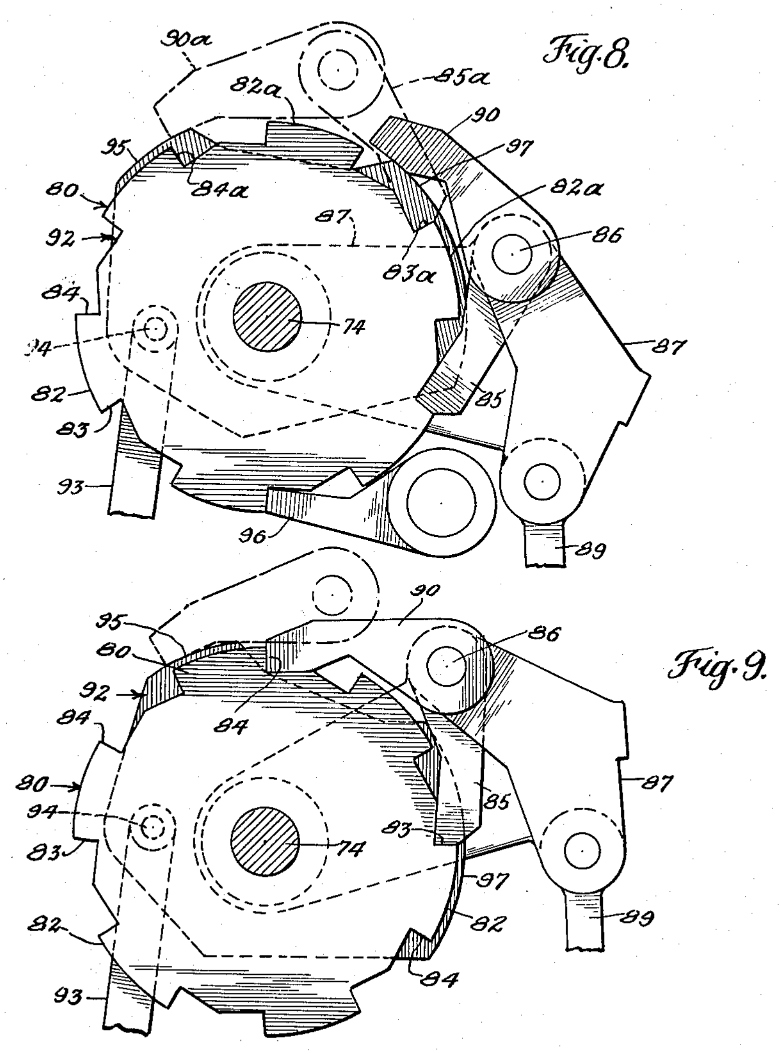
FIGURES 8 and 9 illustrate different operating positions of the mechanism of FIGURE 6.

FIG. 8 illustrates in dot and dash outline the position of the pawl mechanism at the upper end of the stroke of connecting rod 89. The corresponding position of pawl 85 is indicated by the reference character **85*a*. In that position pawl 85*a* is in driving engagement with driving face 83*a* of ratchet tooth 82*a***.

Figure 6:
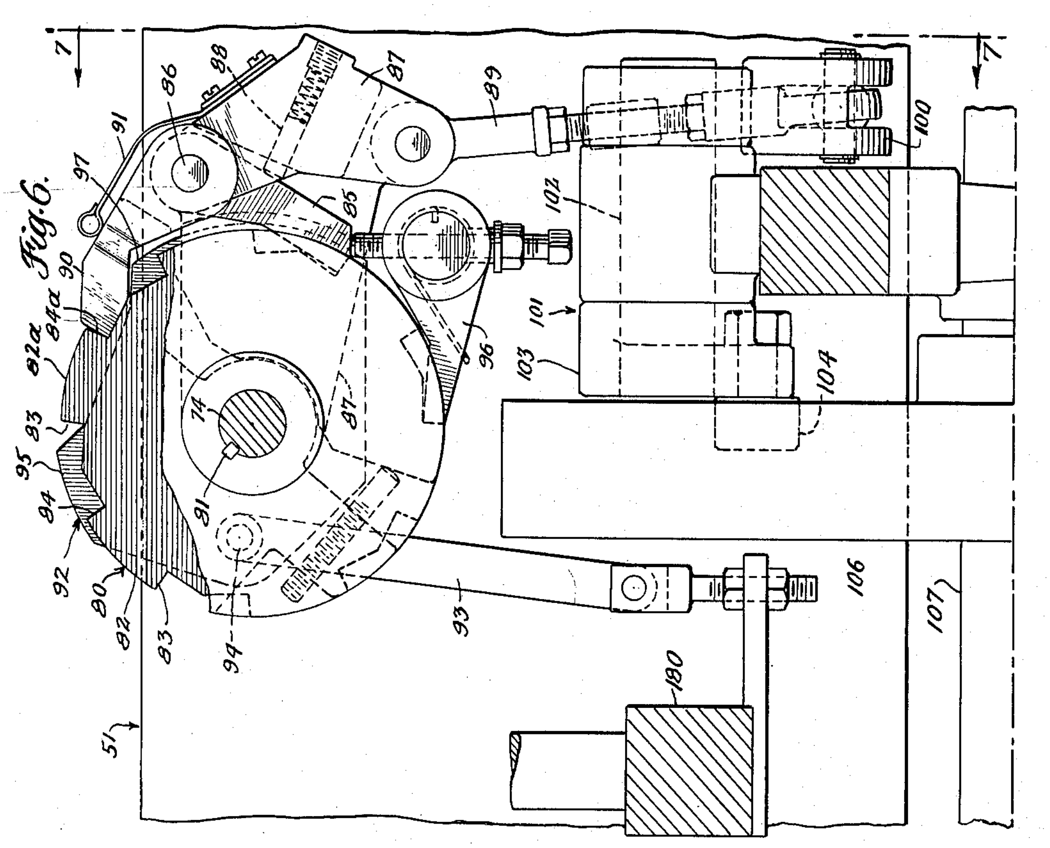
FIGURE 6 is a still further enlarged view illustrating the conveyor indexing mechanism, the view being taken as indicated by the line 6—6 of FIGURE 7.
Figure 7:
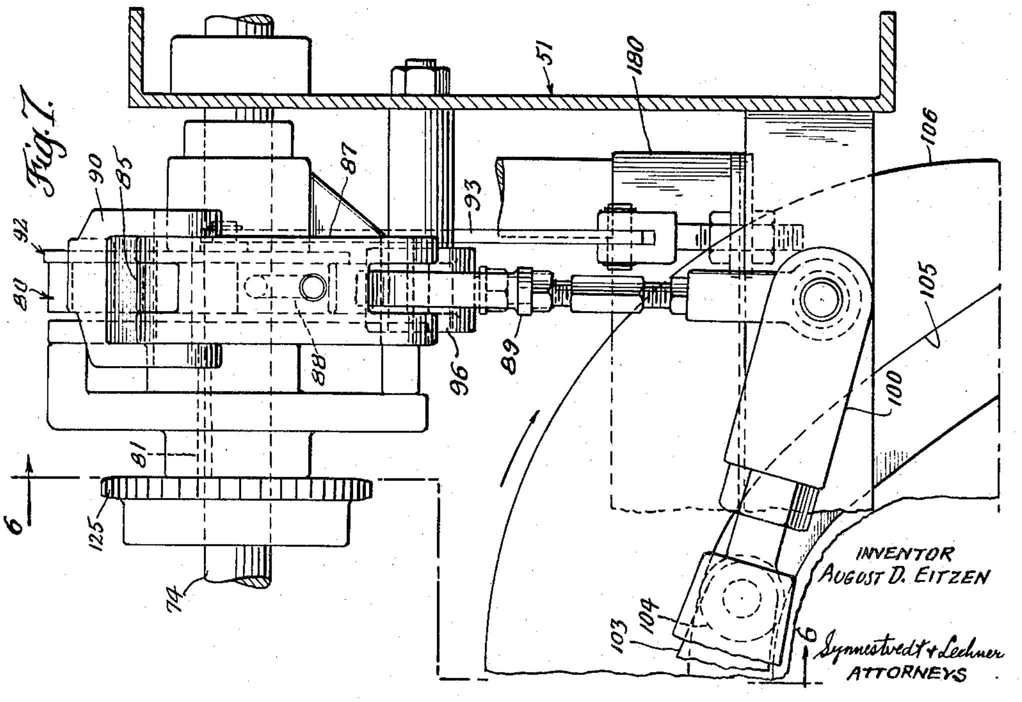
FIGURE 7 is a sectional view taken on the line 7—7 of FIGURE 6.

As connecting rod 89 moves downwardly the parts assume the intermediate position as shown in solid outline in FIG. 9 and ultimately assume their lowest position as illustrated in solid outline in FIGURES 6 and 8.

In order to prevent ratchet wheel 80 from continuing to rotate at the maximum speed of driving pawl 85, after the latter has begun to decelerate due to the configuration of the cam which drives connecting rod 89, there is provided a locking pawl 90 mounted for oscillation on pivot 86 and urged toward engagement with ratchet wheel 80 by a leaf spring 91 (see FIG. 6).

Figure 10:
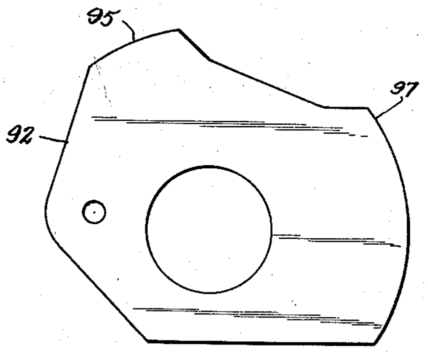
FIGURE 10 is a detailed view of the pawl release plate forming a part of the indexing mechanism.

Movement of locking pawl 90 toward and away from engagement with ratchet wheel 80 is controlled by a release plate 92 whose plan form is illustrated in FIG. 10 and whose relationship to the other portions of the ratchet and pawl mechanism is shown in FIGURES 6 through 9.

Release plate 92 is mounted for oscillation about the center of shaft 74 and is actuated by a link 93 which is pivotally secured to release plate 92 by means of a pin 94. Link 93 is driven by mechanism described below in such timed relationship as to drive connecting rod 89 and to permit engagement of locking pawl 90 with the locking face 84 of a ratchet tooth 82 before driving pawl 85 begins to undergo a decrease from its maximum angular velocity. The operation of locking pawl 90 is as follows:

It will be observed that lobe 95 of release plate 92 will prevent locking inter-engagement between locking pawl 90 and tooth 80 in the azimuth occupied by lobe 95. For example, in FIG. 8, lobe 95 is in a position to prevent the locking pawl (indicated in FIG. 8 in dotted outline at **90*a*) from moving into locking engagement with locking face 84*a*; however, as the pawl assembly moves in a clockwise direction to the position indicated in solid outline in FIG. 9, locking pawl 90 can drop into engagement with locking face 84**.

With the parts disposed as illustrated in FIG. 9, i.e., with both pawls 85 and 90 engaged with ratchet wheel 80, the pawl assembly and ratchet wheel are effectively locked together and the angular velocity of ratchet wheel 80 must conform precisely with the pawl assembly in its clockwise driving stroke. However, when the pawl assembly begins its counterclockwise return stroke, ratchet wheel 80 is held against counterclockwise rotation by spring loaded dog 96, and locking pawl 90 must be disengaged from the ratchet wheel before the counterclockwise backstroke of the pawl assembly can begin. Such disengagement is accomplished by counterclockwise oscillation of release plate 92. As illustrated in FIG. 6, lobe 97 of release plate 92, upon counterclockwise oscillation of the release plate, will engage the lower surface of locking pawl 90 and lift it clear of locking face **84*a* of ratchet tooth 82*a*, to the position shown in FIGURE 8, so that the entire pawl assembly can make its counterclcokwise backstroke. As the pawl assembly moves from the full line position shown in FIG. 8, locking pawl 90** slides over lobe 97 of release plate 92 and thereafter slides over the outer surface of ratchet tooth 82a. While the leading end of locking pawl 90 may drop into the space on the counterclockwise side of ratchet tooth 82a, it ultimately moves up the inclined surface of lobe 95 of release plate 92 and finally assumes the position 90a shown in dot-dash outline in FIG. 8.

When the pawl assembly begins its clockwise driving stroke, driving pawl 85 engages the driving face 83 of one of ratchet teeth 82 as shown in FIG. 9 and locking pawl 90 slides clockwise over the surface of release plate 92 and finally drops into engagement with locking face 84 of tooth 82 of ratchet wheel 80.

The conveyor driving and indexing mechanism just described is, as has been stated, driven through connecting rod 89 and link 93.

Connecting rod 89 is pivotally interconnected to one leg 100 (see FIGURES 6 and 7) of a two-legged rocker arm 101 which is mounted on a rock shaft 102. The other leg 103 of rock arm 101 carries cam follower 104 which cooperates with cam groove 105 of cam 106. Cam 106 is mounted for rotation on cam shaft 107, which shaft is driven through sprocket 108 and drive chain 109, which is in turn driven by sprocket 110 of reduction gear mechanism R. Release plate 92 is oscillated in the proper time relationship by means of a linkage through link 93 to lower cross bar 180 of the heat seal unit to be described below.

It will be seen from what has been described so far that conveyor chain 55 moves intermittently and clockwise (as shown in FIG. 1). The tape is formed on the table members 54 in the upper (or rightwardly moving) run of chain 55.

The first element of the tape which comes into engagement with conveyor chain 55 is the lower run of paper, which is drawn from supply roll 111 (see FIG. 1). From supply roll 111, the paper 112 passes to a post 113 and thence to a driving capstan 114 and a spring-loaded pinch roller 115, from whence the paper runs downwardly and passes in a bight around a weighted bar 116 carried on arm 117, which is mounted for oscillation about a pivot 118. The paper passes from rod 116 upwardly over an idler 119 and thence downwardly to the nip between a tape correcting capstan 120 and a pinch roller 121, thereafter through tape guides 122 and 123 and under a weighted hold-down bar 124, which maintains the run of paper against the upper face of members 54 of conveyor chain 55. The tape correction capstans 120 and 120a receive their drive from the conveyor drive shaft 74 by means of chain drives 125, 128, and 129. Hence, the operation of capstan 120 is intermittent and in phase with the motion of conveyor chain 55.

As will appear from the following description, the lower run of paper is ultimately locked securely to the members 54 of conveyor chain 55, as a consequence of which the paper as it comes into engagement with the top of the conveyor is moving at the same rate as the conveyor.

Figures 11, 12, 13:
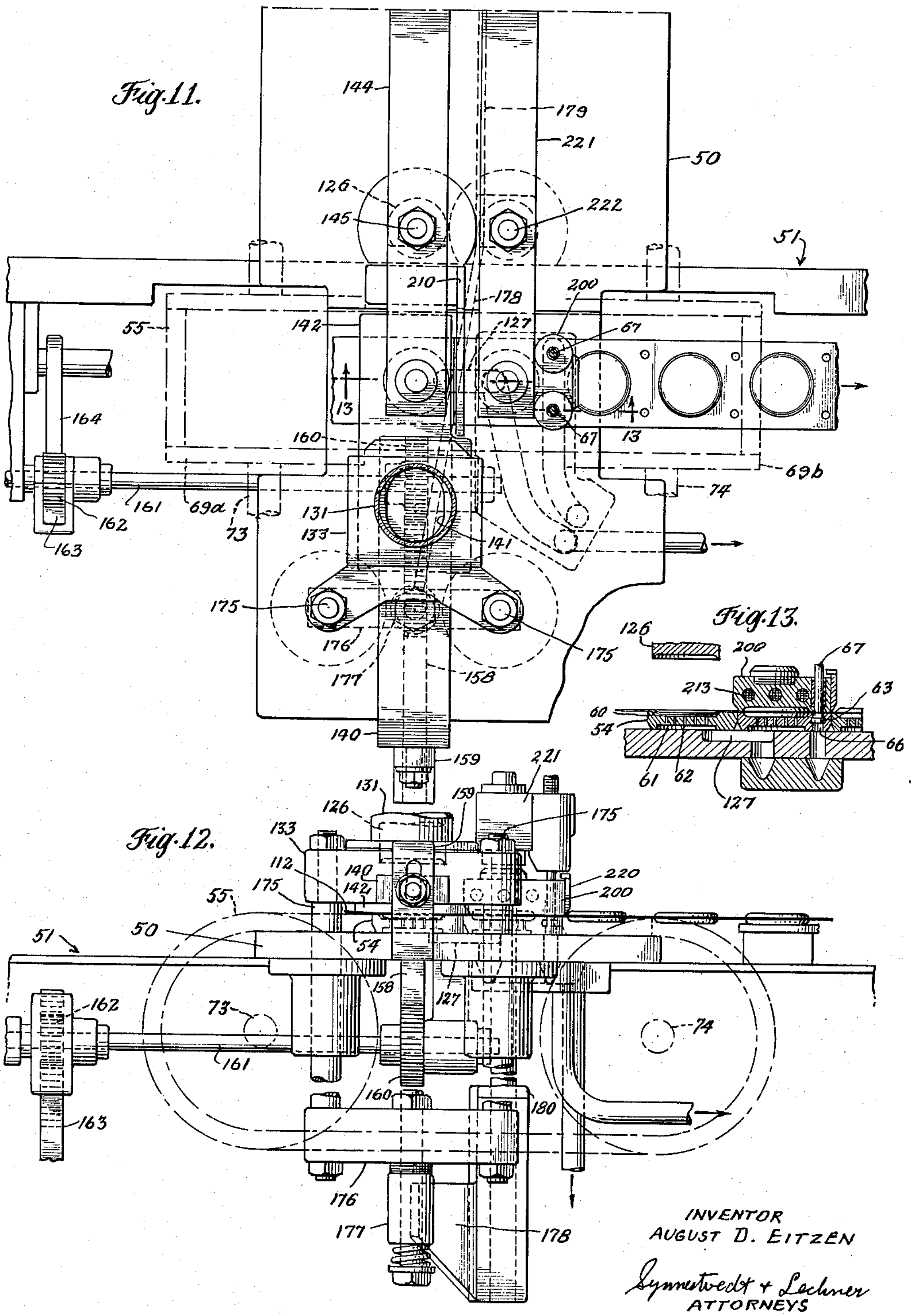
FIGURE 11 is a plan view of one half of the machine taken as indicated by the line 11—11 of FIGURE 1 and showing the relative locations of the commodity feeding unit, the briquetting plunger, the heat sealing mechanism and the conveyor, the latter being diagrammatically illustrated by dot and dash lines.
FIGURE 12 is a front elevational view of the mechanism of FIGURE 11.
FIGURE 13 is a fragmentary sectional view taken on the line 13—13 of FIGURE 11 and showing the briquetting plunger retracted and the heat sealing head and hole punch in punching positions.
Figure 14:
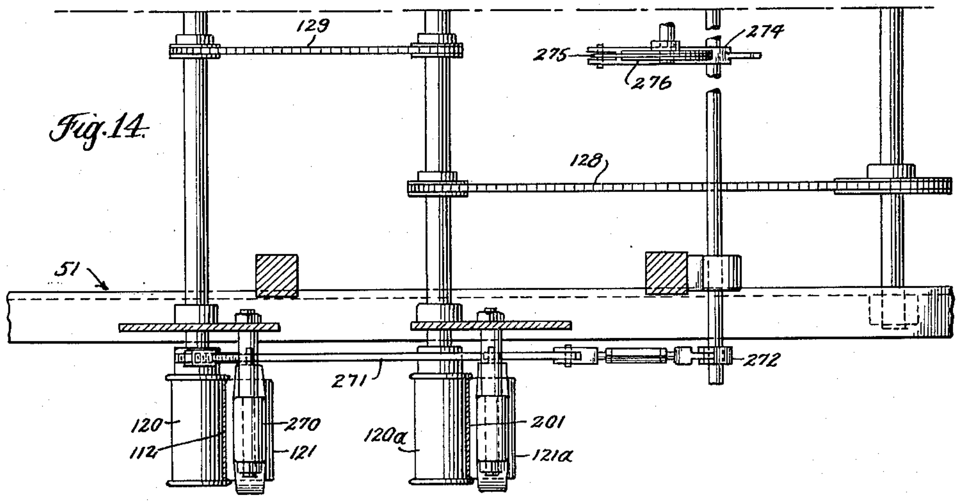
FIGURE 14 is an enlarged fragmentary plan section of one half of the machine taken on the line 14—14 of FIGURE 1 and illustrating the tape correction mechanism of the machine.

When a member 54 of conveyor chain 55 comes into position beneath briquetting plunger 126, recess 61 of member 54 extends over the end of, and is in communication with, vacuum slot 127 (FIGURES 11–13) in the upper surface of table 50. The evacuation of the air from recess 61 results in the evacuation of air under the paper 112 and pulls the latter down into partial contact with the floor of pocket 60. When the member 54 is precisely indexed under briquetting plunger 126, conveyor chain 55 is momentarily stopped by the mechanism already described.

While the conveyor is stopped a charge of coffee is deposited on the upper surface of the lower run of paper and the coffee is briquetted by the briquetting plunger in the following manner:

Ground coffee is charged into coffee reservoir 130, and an operating level of coffee is maintained in column 131 by means of a photoelectric control device 132. Column 131 is mounted on a hollow base member 133; immediately beneath base member 133 is the coffee transfer mechanism illustrated in FIGURE 5 and in detail in FIGURES 21 through 27.

Figure 5:
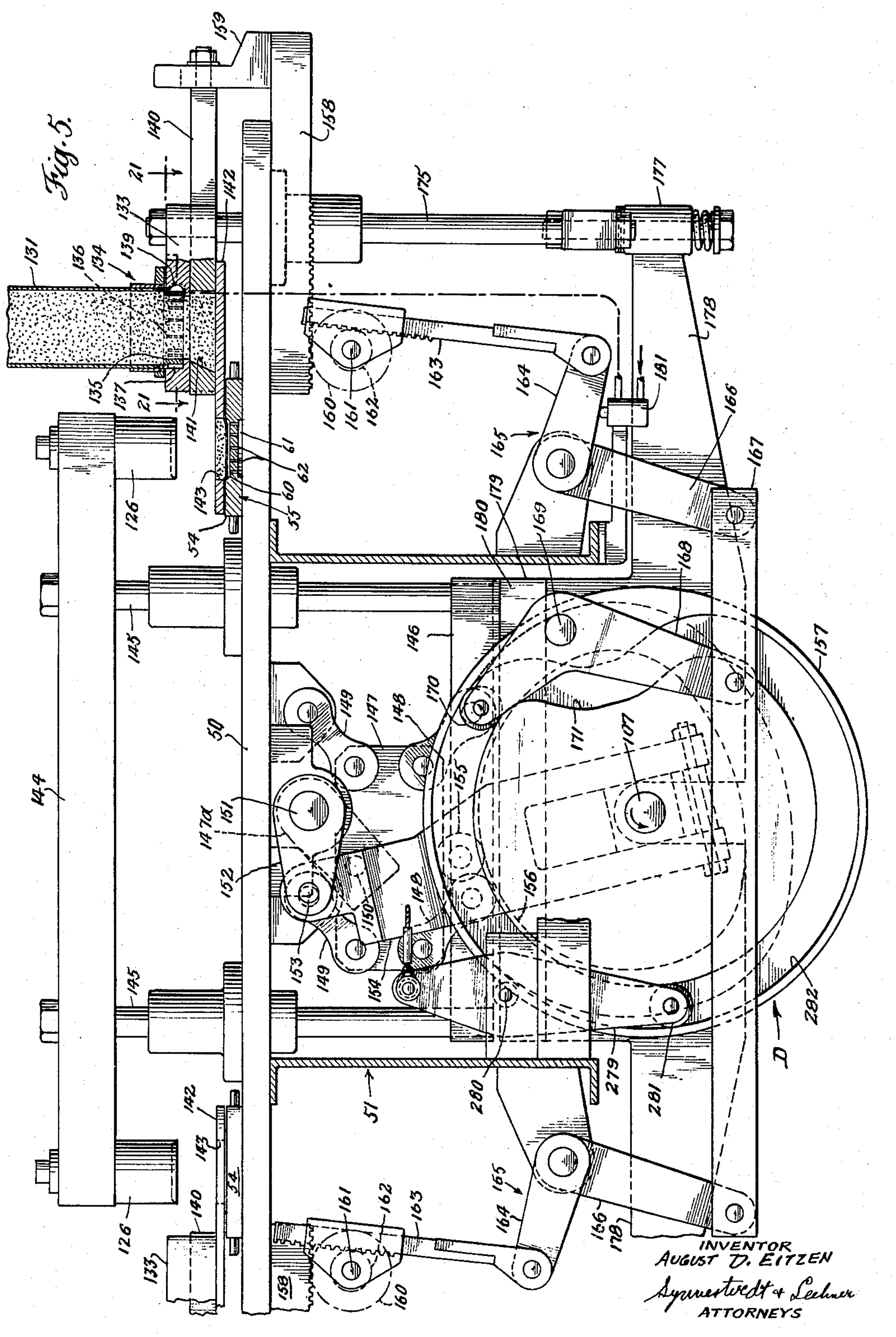
FIGURE 5 is an enlarged cross section taken on the line 5—5 of FIGURE 1 illustrating the commodity transfer mechanism and the toggle mechanism for actuating the briquetting plungers.

The coffee transfer mechanism comprises a fluidizing means 134, which includes a cylindrical sleeve 135 whose inner space is in communication with the interior of column 131 and whose wall is pierced with a series of apertures 136. An annular space 137 surrounding sleeve 135 is supplied with air through fitting 138 and passage 139. Immediately below the fluidizing means is a transfer slide 140 mounted for reciprocal movement from right to left as viewed in FIG. 5 and having a cylindrical coffee receiving chamber 141 adapted to register with an end of the cylindrical bore of the coffee fluidizing means 134. The bottom of chamber 141 is closed, when member 140 is in its right-most position as illustrated in FIG. 5, by a fixed metering plate 142. Metering plate 142 is provided with a metering chamber 143 in registration with the position of the recess 60 of a chamber 54 of conveyor 55 indexed in briquetting position.

Figures 20, 21, 22, 23, 24, 25, 26, 27:
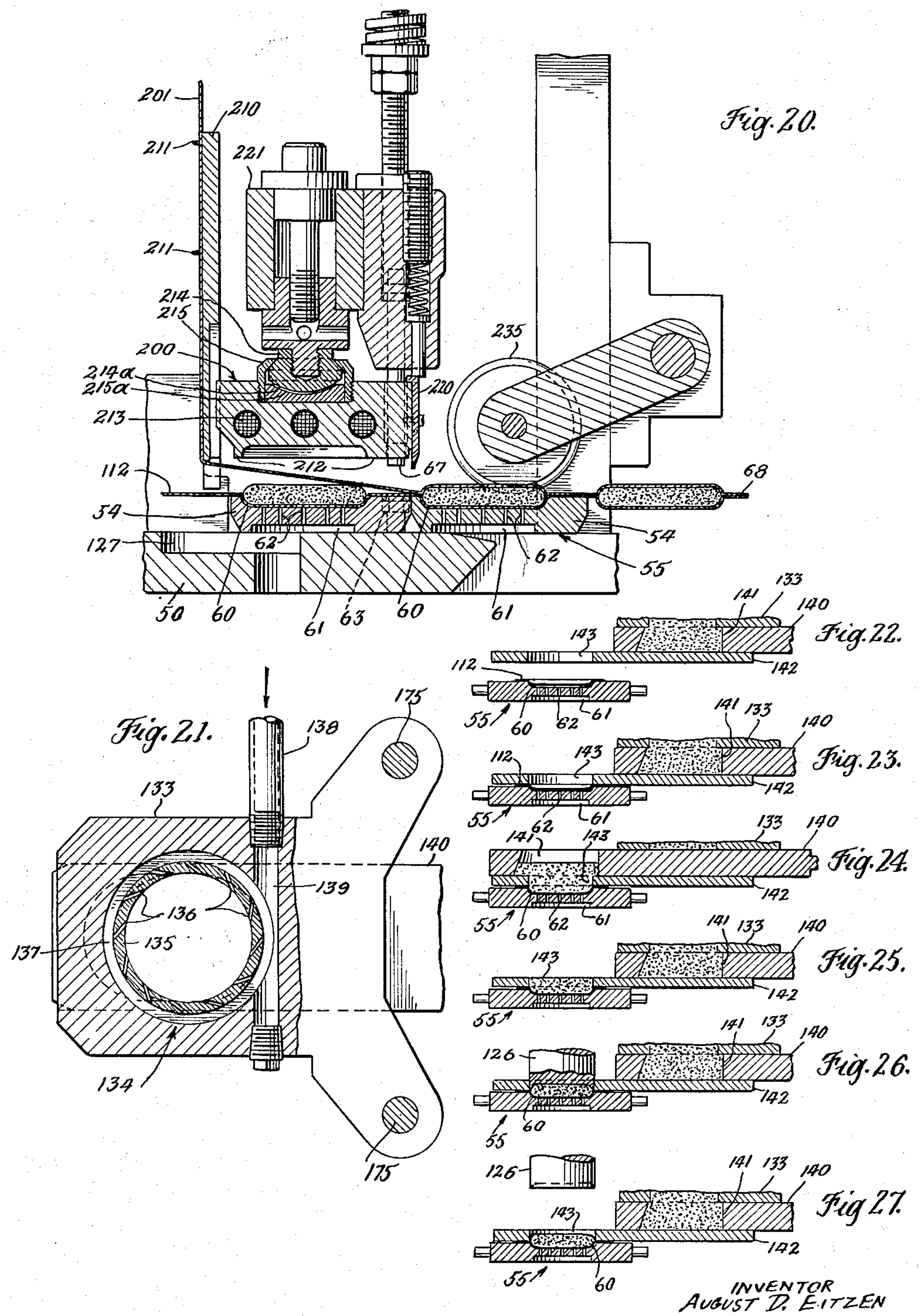
FIGURE 20 is an enlarged vertical sectional view of the heat sealing device of the mechanism.
FIGURE 21 is an enlarged plan section of the commodity fluidizing device taken on the line 21—21 of FIGURE 5.

Briquetting plunger 126 is mounted for vertical reciprocal movement between the elevated position illustrated in FIG. 5 and a compression position illustrated in FIG. 26. Both plungers 126 are mounted on cross bar 144 which is in turn supported by posts 145. Reciprocal movement is given post 145 by the following mechanism:

The lower ends of posts 145 are secured to a lower cross bar 146, which is in turn connected to a movable plate 147 by means of a pair of toggle links 148. Plate 147 is in turn movably suspended from table 50 by a pair of toggle links 149. Plate 147 is driven by a crank arm 147a connected thereto by pin 150 and having a rock shaft 151. Rock shaft 151 is driven by a second rock arm 152 pivotally secured by a pin 153 to a follower link 154 straddling cam shaft 107 and carrying a cam follower 155 in engagement with cam groove 156 of briquetting cam 157.

Transfer slide 140 is drivingly interconnected with a rack 158 by means of bracket 159. Rack 158 is driven by a pinion 160 mounted on a shaft 161 which is in turn driven through a pinion 162 by a rack 163. Rack 163 is pivotally interconnected with one arm 164 of a bell crank 165 whose other arm 166 is pivotally interconnected with a cross link 167. Cross link 167 is supported only by the two arms 166 of bell cranks 165, and is driven by bell crank 168, which is mounted for oscillation on pin 169 and which carries cam follower 170 which is in engagement with cam groove 171 of briquetting cam 157.

The entire coffee charging and metering mechanism is mounted for vertical reciprocal movement so that metering plate 142 can be lifted clear of conveyor 55 and the lower run of paper carried thereon. For this purpose the coffee charging and metering mechanism is mounted on rods 175 which extend downwardly to cross bar 176 (see FIGS. 5 and 12) which is in turn connected to a boss 177 formed on web 178, which web extends diagonally across the machine, as illustarted in dotted outline in FIG. 11, to a point 179 of interconnection with lower heat sealing cross bar 180. The reciprocating drive of lower cross bar 180 will be described below.

The operation of the coffee charging and metering and briquetting mechanism is accomplished as follows:

At the start of the operation the coffee charging and metering mechanism is spaced above conveyor 55 as illustrated in FIG. 22. The mechanism now moves down to the position illustrated in FIGURES 23 and 25, whereupon a blast of air is introduced into the coffee fluidizing mechanism 133 (as illustrated in FIG. 21) by control valve 181 which is adapted to be opened when arm 164 of crank 165 is in the lower portion of its range of movement. The coffee in the fluidizing means 134 is fluidized by the air and is free to drop into coffee chamber 141 of transfer plate 140. Transfer plate 140 now moves to the left to the position illustrated in FIGURE 24, and a portion of the coffee in chamber 141 of transfer plate 140 drops through metering chamber 143 of metering plate 142 and into the partially formed dimple in paper 112 lying in pocket 60 of member 54. As soon as the coffee begins to cover the surface of the paper in pocket 60, the passage of air through the paper is reduced and the paper is drawn down tightly against the floor of pocket 60. Transfer plate 140 now moves to the right, i.e., to the position shown in FIG. 25, leaving coffee in the pocket in paper 112 and chamber 143 of metering plate 142, the total amount of coffee deposited being determined by the thickness of metering plate 142.

It should be noted at this time that the machine may be adjusted to deposit different quantities of coffee in each pod by replacing metering plate 142 with a plate of greater or less thickness. The combination of the shearing action of the transfer plate which strikes the amount of coffee in the metering chamber flush with the top of the metering plate with the employment of vacuum to pull paper into contact with the bottom of control 60 insures precise metering of whatever amount of coffee is desired to deposit in each pod.

Briquetting plunger 126 now descends and, in passing through aperture 143 in metering plate 142, compresses the coffee to the form of briquette illustrated in FIG. 27. It will be noticed that the lower surface of briquetting plunger 126 is configured to form a mirror image of the floor of pocket 60 in member 54. Briquetting plunger 126 is now withdrawn and the entire coffee metering mechanism is elevated once more to the position illustrated in FIG. 22. The specific carrier 54 just described, i.e., the member 54 carrying the lower run of paper and a completed briquette of coffee, now passes to the heat sealing station illustrated in FIG. 20, which station is in registration with heat sealing head 200.

Before the heat sealing step can be accomplished, however, the upper run of paper must be brought into position. The upper run of paper 201 is drawn from a paper reel 202 (see FIG. 1), from whence it passes downwardly around a post 203 and thence around driving capstan 204 and between capstan 204 and a spring loaded pinch roller 205. From there, paper 201 passes in a bight around a weighted bar 206 carried on an arm 207 which is pivotally mounted at 208. From bar 206, paper 201 goes around idler 209 then downwardly to the nip between a correcting capstan 120*a* and a pinch roller 121*a* and then straight downwardly to a position of sliding engagement with a guide plate 210 and between guide pins 211 protruding therefrom. From the lower end of guide plate 210 (see FIG. 20) paper 201 extends generally horizontally above the just-formed briquet of coffee.

Heat sealing head 200 comprises an annular heat sealing surface 212 which has electric heating elements 213. When heat sealing head 200 is in its elevated or retracted position it is supported from a shouldered fitting 214 by means of an internally shouldered bushing 215. However, bushing 215 is free to move upwardly with respect to fitting 214. When fitting 214 is moved downwardly by mechanism to be described, downward force is transmitted to head 200 by means of the spherical surfaces 214*a* and 215*a*; thus, when head 200 comes into engagement with the upper surface of the paper run 201 and presses it against member 54, head 200 is free to accommodate itself to any variation in thickness of the tape and exert a uniform pressure in a continuous zone extending around the briquette of coffee. Those skilled in the art will understand that the paper employed is of a type which is capable of being adhesively heat sealed upon the application of heat and pressure of the kind developed by the just-described operation of heat sealing head 200.

Heat sealing head 200 also carries a pair of spring loaded anvils 67 which cooperate with dies 63 in the manner above described to provide indexing perforations in the finished coffee tape. In addition, heat sealing head 200 carries stripper plate 220 whose lower edge is spring loaded to a position lower than head 200 but which is free to retract when heat sealing head 200 is in pressure engagement with the tape on member 54. Stripper plate 220 serves to strip the upper surface of paper 201 from heat sealing head 200 when the latter begins its upward stroke.

Heat sealing head is reciprocally driven through upper heat sealing cross bar 221 which in turn is driven by studs 222 which are connected to lower heat sealing cross bar 180. Lower heat sealing cross bar 180 is mounted and reciprocally driven in a manner similar to the drive of lower briquetting cross bar 146, i.e., cross bar 180 is connected by a pair of toggle links 223 to a plate 224 which is in turn suspended from table 50 by a pair of toggle links 225. Plate 224 is driven by a crank 226 which is mounted on a crank shaft 227 which in turn carries a crank arm 228 pivotally connected at 229 to a follower link 230 which straddles cam shaft 107 and which carries a cam follower 231 which engages a cam groove 232 in heat sealing cam 106.

The operation at the heat sealing station is as follows: When heat sealing head 200 descends from the position illustrated in FIG. 20, it engages the upper run of paper 201 and presses it against the lower run of paper 112 in a circumferential zone completely surrounding the coffee briquette and raises the temperature of the paper in that zone to the point at which adhesion between two layers of paper is effected. At the same time anvils 67 force the tape against cutting edges 64 of dies 63, which cut circular indexing holes through the tape, the circular portions being sucked out through passage 66 discussed above. Also at the same time, stripper plate 220 is brought into engagement with the upper surface of the tape in the zone extending across the tape adjacent the coffee pod sealed in the just previous operation. When heat sealing head 200 moves upwardly, the heat sealing surface clears the tape first, followed by anvils 67, and finally by stripper plate 220. When heat sealing head is clear of the tape the conveyor is advanced one station and the operation is repeated.

Figure 3:
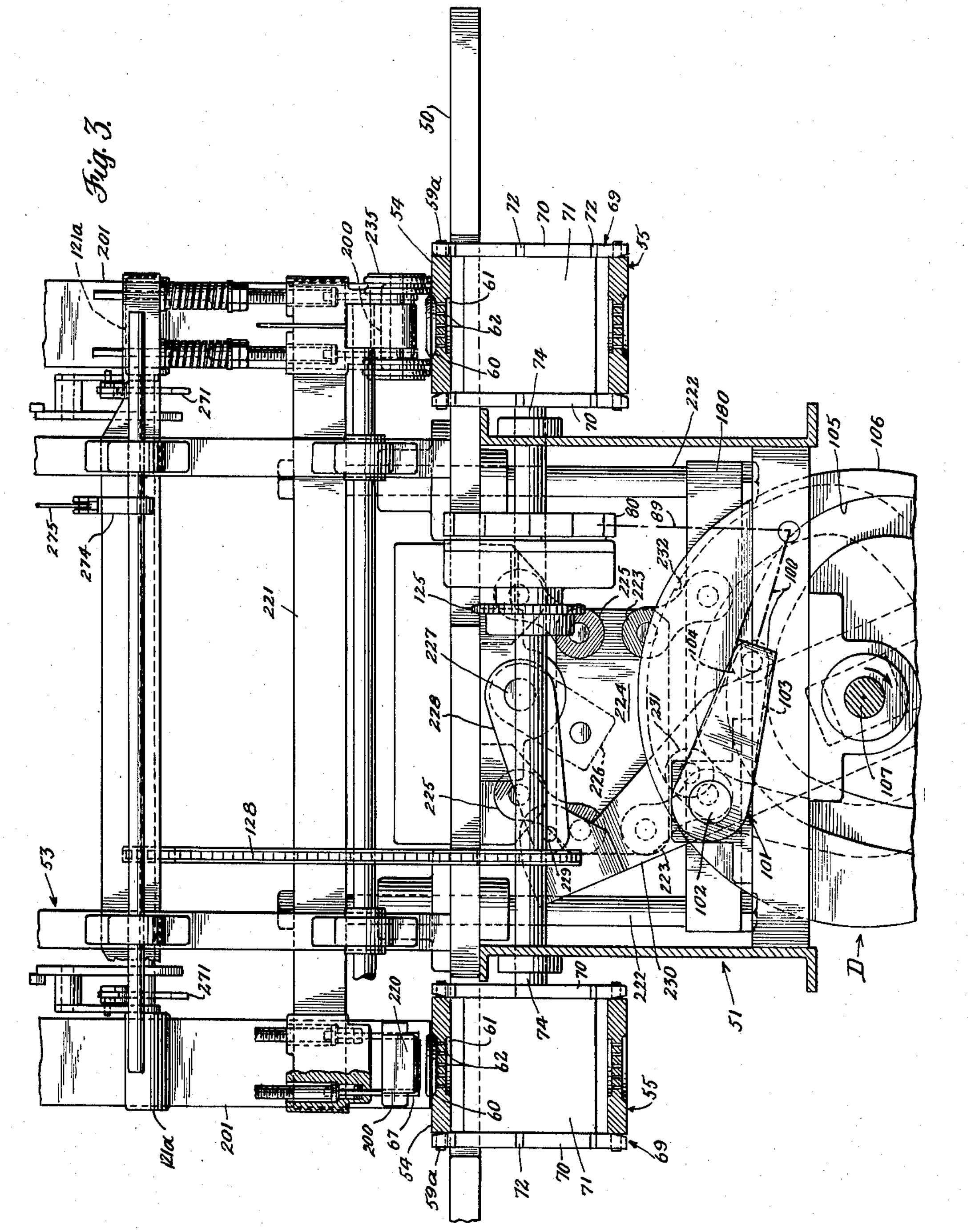
FIGURE 3 is an enlarged sectional elevational view taken approximately on the line 3—3 of FIGURE 1 and illustrating the toggle mechanism for actuating the heat sealing units and the punches for producing indexing holes in the tape.
Figure 4:
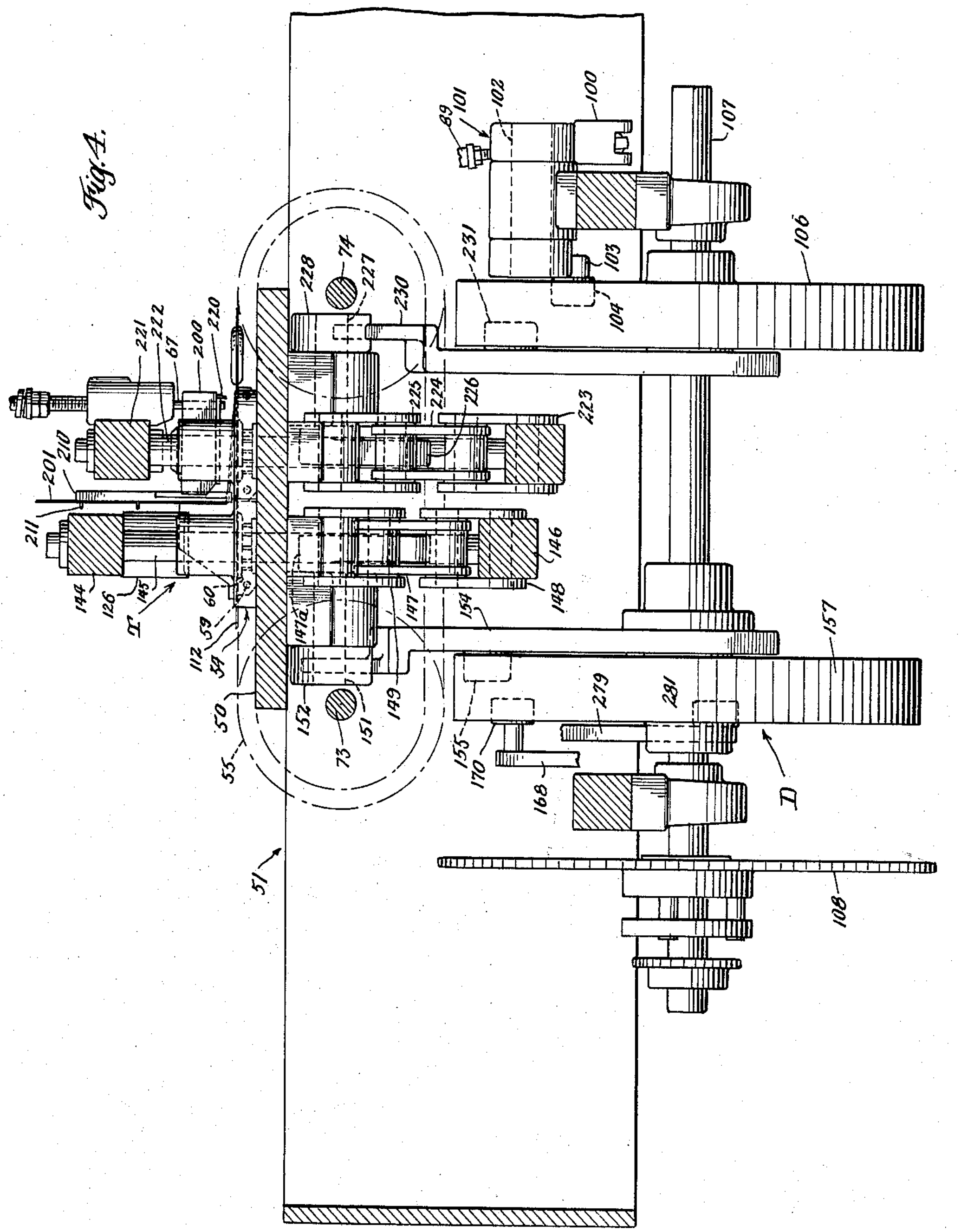
FIGURE 4 is an enlarged cross section taken on the line 4—4 of FIGURE 2 illustrating the arrangement of the briquetting plungers, the heat sealing units and hole punches and their toggle mechanisms and also diagrammatically indicating the disposition of the conveyors.

In FIGS. 3 and 20, there is illustrated a pair of hold-down rollers 235 which serve to maintain the finished tape in position on conveyor member 54 while the latter is at the station immediately following the heat sealing station, and thereby provides for driving interengagement between the conveyor and the finished tape and hence with the two strips of paper in their separate runs.

In this connection, it should be noted that the conveyor runs intermittently and that the mechanism which pulls paper from the paper rolls runs continuously. The machine includes means for accommodating the requirement of the tape forming mechanism for a supply of paper which can be accelerated and decelerated quickly, and which will impose no load on the tape forming mechanism.

The mechanism for feeding the upper and lower runs to the tape forming mechanism is substantially identical; only the mechanism for supplying the lower run of paper will be described in detail. Capstan 120 and pinch roller 121 are operated at a speed capable of supplying paper at a rate slightly in excess of the linear velocity with which the conveyor moves, as a consequence of which during the period when the conveyor is moving from one station to the next a slack accumulates between capstan 120 and the tape forming mechanism.

While such slack is desirable as a means of freeing the tape forming mechanism of the necessity of pulling the tape, it is equally desirable to avoid an excessive accumulation of such slack. Accordingly, pinch roller 121 is released from its engagement with capstan 120 during the period when the conveyor is stopped, so that the slack which had accumulated between the capstan 120 and the tape forming mechanism can be taken up. When pinch roller 121 is released weighted bar 116 draws the paper taut, and the slack which had existed between capstan 120 and the tape forming mechanism now appears as an additional length of tape in the run between capstan 114 and idler 119, i.e., the bar 116 drops down by an amount equivalent to the slack taken up. Capstan 114 runs at the same speed as capstan 120 and, as a consequence of the action just described, bar 116 drops a little lower with each cycle of operation. At the bottom of the desired range of rod 116, the drive to capstan 114 is stopped momentarily and, as a consequence, rod 116 is raised to the predetermined upper limit of its motion, whereupon capstan 114 is restarted.

Figure 15:
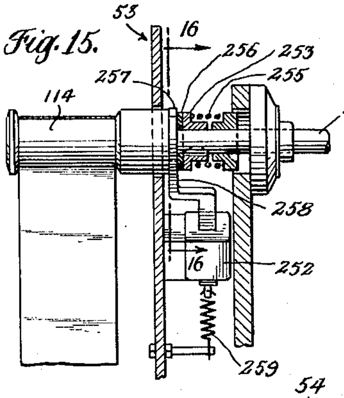
FIGURE 15 is a detailed fragmentary view of a tape feed clutch of the machine taken on the line 15—15 of FIGURE 1.
Figure 16:
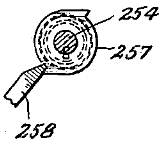
FIGURE 16 is a detailed view of the latch of the clutch mechanism of FIGURE 15.

The mechanism by which rotation of capstan 114 is controlled by the position of rod 116 is a follows:

Rod 116 is carried by rod 117 and carries with it a cam member 250 which actuates a switch 251. Switch 251 controls a solenoid 252 which in turn actuates a brake (see FIG. 15) for stopping capstan 114. The drive of capstan 114, as illustrated in FIG. 15, is effected through a clutch comprising a driving member 253 keyed to drive shaft 254 and urged by a spring 255 against a driven member 256, which is mounted for rotation with capstan 114. Also mounted for rotation with capstan 114 is a ratchet wheel 257 (see FIG. 16) which is adapted to be engaged by a latch 258 actuated by solenoid 252. Latch 258 is normally held out of engagement with ratch 257 by spring 259, but upon energization of solenoid 252 the latch is engaged and capstan 114 stops rotation.

The drive shaft 254 is driven by gear 260, which meshes with gear 261 (see FIG. 1) keyed on the corresponding drive shaft 262 of the clutch unit of capstan 204 for the upper run of paper 201. The drive shaft 262 receives its drive from the cam shaft 107 by means of sprocket 263, chain 264, sprocket 265, lay shaft 266 and bevel gearing 267.

The disengagement of pinch roller 121 from capstan 120, while the conveyor is stationary, is effected by an interconnection with briquetting cam 157. Such interconnection comprises the following elements. Pinch wheel 121 is supported by a link 270 which is connected to a correction bar 271 which is supported for horizontal movement by a crank arm 272 of a crank 273. Crank 273 is also provided with a second arm 274 to which is secured the end of a cable 275 (shown in dotted outline in FIG. 1) which cable runs over pulleys 276, 277 and 278 to a point of connection with cam follower arm 279 pivotally mounted at 280 and carrying a cam follower 281 in engagement with cam groove 282 of briquetting cam 157.

As will be apparent from the foregoing description the coordination of the various operations performed by the machine as so far described is effected by the several cam mechanisms by which the various parts of the machine are driven. The actual cam surfaces consist of two grooves in one cam and two grooves in the other, both cams being mounted on the same shaft.

The relative timing of the various operations is illustrated in FIG. 28, in which is illustrated the manner in which the positions of the five cam followers vary as a function of the rotational position of the cam shaft. The condition represented by 90 degrees in FIG. 28 is the condition illustrated in FIG. 1, i.e., the conveyor is stationary, the heat seal head is in its upward position, and just starting its downward movement, the coffee transfer plate 140 is in its retracted position (to the right as illustrated in FIG. 5), the briquetting head in its upward position, and pinch wheel 121 is engaged with capstan 120. While the cam shaft is rotating from 90 degrees to 360 degrees the conveyor is stationary, although the driving pawl assembly of FIG. 6 goes through its return stroke between 180 and 270 degrees and dwells in the return position for an additional 40 degrees (during which it is *over* returned); although it starts its return stroke at about 310 degrees it does not renegotiate the over-return and engage the conveyor drive until about 340 degrees and even then dwells an additional 10 degrees before it actually begins the forward drive of the conveyor. It is during the period that the conveyor is stationary that the coffee transfer, briquetting and heat seal operations must be performed. The coffee transfer and briquetting operations occur at the briquetting position and must, therefore, be performed sequentially. It will be noted from FIG. 28 that coffee transfer begins at about 130 degrees and is completed at about 225 degrees and that the briquetting operation begins at about 220 degrees and is completed by about 360 degrees.

The heat sealing operation is performed at a separate station and is arranged to continue through substantially all of the 270 degrees of rotation during which the conveyor is stationary.

The tape correction—or slack removing operation—is performed between about 250 degrees and 350 degrees.

It should be noted that the tape correcting and coffee transfer operations, while they are displaced by about 100 degrees are similar in form. This is because these two operations are actuated by two cam followers which engage the same cam groove.

It will be observed that the full line position of the pawls in FIG. 8 shows the condition represented by 180 degrees in FIG. 28 and that the dot and dash position shows the condition represented by 270 degrees. Since the heat seal head is in its down or heat sealing position between 180 degrees and 270 degrees, the release plate 92 is in its locking pawl lifting position during this period.

The full line position of the pawls in FIG. 9 shows the condition represented by 45 degrees, in which the heat seal head has moved to its upper retracted position and has thus oscillated the release plate 92 clockwise, the driving pawl 85 has rotated the ratchet wheel in a clockwise direction through one half of its advance, and the locking pawl 90 has dropped into locking position. The dot and dash position of the locking pawl represents the 0 degree point.

The tape produced by the machine described above has several characteristics.

First, the tape is especially constructed to meet the requirements of automatic coffee brewing machines of the kind disclosed in the copending application above referred to. In such machines coffee is brewed by gripping the tape between two members which engage the tape from opposite sides in a circumferential zone extending around a single coffee pod. Water at high temperature and relatively high pressure is forced through the pod from one side to the other. Since many such machines are used as coin operated vending machines, a prime consideration is rapidity of coffee brewing which in turn calls for the use of relatively high pressure to force a cup of water through the coffee pod in a length of time which is short enough to satisfy the customer. It has been found that a coffee tape whose pods are slack filled with coffee grounds will inevitably present to the extracting water a cross section of varying coffee density with the result that most of the water passes through the regions of low density and bypasses the regions of high density. When this occurs the extraction process is incomplete, and the resulting cup of coffee unsatisfactorily weak.

According to the present invention the coffee is compressed to form a uniform and relatively dense briquette; and the paper making up the tape is pressed into tight contiguity with the entire surface of the briquette. Furthermore, the two runs of paper are adhesively secured to one another in circumferential zones extending to contact with the edge surface of the briquette which edge is precisely defined because of the briquetting operation. This means that the volume enclosed by the paper within the adhesively bonded portions is precisely equal to the volume of the compressed coffee briquette so that the density of the coffee is maintained even in the event that the form of the briquette is distorted, or the briquette crumbled, at some time between the time of manufacture of the tape and the time of brewing.

The second feature of the coffee tape of the present invention lies in its shape. It will be noted that the upper and lower surfaces of the briquette are flat and parallel to one another except at the very edges. This shape has been found to be far superior to the lentil shaped pod heretofore used in automatic coffee brewing machines from the point of view of uniformity and completeness of extraction.

Finally, automatic coffee brewing machines require coffee tapes whose dimensions are precisely controlled within very small limits. This is particularly true of the location of the coffee pods with respect to the margins of the tape and one another and of the location of the index holes with respect to the coffee pods. It has been found that the punching of the holes simultaneously with the heat sealing operation (which determines the final position of the coffee pod) insures accuracy of registration of the pod with the extracting equipment in coffee brewing machines.

While I have described the invention in terms of the production of tapes for use in coffee brewing, it will be understood that the invention is also useful in the production of tapes carrying other beverage materials such as tea and chocolate and still further that the invention is useful in the packaging of other powdered materials such as face powder. In producing tapes which are not intended for use in extraction equipment, impermeable materials may, of course, be substituted for the water permeable materials used in the described embodiment. In such cases, the packaged material is retrieved by tearing the pod open.

I claim:

1. Equipment for producing a beverage tape, including a series of conveyor members each of which has a tape engaging surface having a depression therein, means for moving said members in a continuous path, means for directing a run of water permeable material into engagement with the tape engaging surfaces of consecutive members in a portion of said path, means for depositing a measured quantity of beverage material on the portion of said water permeable material adjacent the depression in each such member, means for applying pressure to the beverage material to compress the same and form a briquette, means for leading a second run of water permeable material into engagement with the first over said briquettes, means for adhesively sealing said second run to said first run in zones completely surrounding each such briquette, and means for producing an indexing perforation in said permeable material in predetermined space relationship to each briquette.

2. Equipment in accordance with claim 1 and further including mechanism for moving said members in said path intermittently so as to sequentially move into and dwell in a briquetting station and an adhesively sealing station.

3. Equipment for producing a beverage tape including a continuous conveyor having a continuous series of tape engaging positions thereon, means for moving said conveyor, means for directing a run of water permeable material into engagement with a plurality of the tape engaging positions of said conveyor, means for depositing a measured quantity of beverage material on the portion of said water permeable material directly over each such position, means for applying pressure to the deposited measured quantity of beverage material to compress the same and form a briquette projecting above said water permeable material, means for leading a continuous second run of water permeable material into engagement with the first and over said briquettes, means for deforming said second run of water permeable material to conform with the projecting parts of the briquettes, and means for adhesively sealing said second run to said first run in zones surrounding each such briquette.

4. Equipment for producing a powdered-commodity-ity-carrying tape, including a forming member having a tape engaging surface with a depression therein, means for laying a strip tape material over the depression in said surface, a powdered commodity supply, means for aerating the powdered commodity, means for measuring aerated charges of the powdered commodity, vacuum means for drawing the tape material into the depression in the forming member, the forming member and the measuring means being relatively moveable to bring the measuring means into and out of registry with the depression in the forming member to provide for delivery of an aerated charge from the measuring means into the pocket formed by drawing the tape material into the depression in the forming member, and means for closing said pocket with the measured charge of powdered material therein.

5. Equipment for producing a powdered-commodity-carrying tape, including a forming member having a tape engaging surface with a depression therein; means for laying strip tape material over the depression in said surface, a powdered commodity supply, means for aerating the powdered commodity, means for measuring aerated charges of the powdered commodity, vacuum means for drawing the tape material into the depression in the forming member, the forming member and the measuring means being relatively moveable to bring the measuring means into and out of registry with the depression in the forming member to provide for delivery of an aerated charge from the measuring means into the pocket formed by drawing the tape material into the depression in the forming member, means for compressing the charge of aerated material in said pocket, means for laying strip tape material over the compressed charge in said pocket, and means for sealing the charge between the first and second mentioned strip tape material.

6. Equipment for producing a powdered-commodity-carrying tape, including a supply of strip tape material, means for aerating the powdered commodity, means for delivering a measured charge of aerated powdered commodity to a localized zone of said tape material, means for compressing the aerated charge in situ on the tape to form a briquette, means for laying strip tape material over the compressed charge, and means for sealing the compressed charge between the first and second mentioned strip material.

7. A method for forming a tape carrying compressed masses of a powdered commodity, which method, comprises aerating the powdered commodity, measuring charges of the powdered commodity while in aerated condition, delivering measured aerated charges of the commodity to spaced localized zones on a strip of tape material, compressing the charges in situ on the tape to form localized compressed masses, applying strip tape material over the compressed masses and sealing said masses between the first and second mentioned tape material in separated localized zones therebetween.

8. A method according to claim 7 in which the charges of the powdered commodity are sequentially measured, delivered to the first tape material, compressed and sealed.

9. A method for encapsulating a powdered commodity in a paper package which comprises distorting a first paper strip to form a depression therein, delivering a measured charge of powdered commodity to said depression, said measured charge being sufficient in quantity to overfill the depression, after delivery of the measured charge to said depression, applying pressure thereto to compress the charge and thus form a briquette having a part projecting out of said depression, laying a second strip of paper over said first strip and said briquette, thereafter deforming said second strip of paper to fit around said briquette and thus conform said second strip to the shape of the projecting part of said briquette and sealing said first and second strips of paper together around the perimeter of said briquette.

10. A method for forming a tape carrying a powdered commodity, which method comprises delivering measured charges of powdered commodity to spaced localized zones of a strip of tape material, applying pressure to the delivered charges to compress the charges in situ on the tape, applying a continuous run of tape material over the compressed charges, after application of said continuous run deforming the overlying tape material to fit tightly over said compressed charges, sealing the charges between the first and second mentioned tape material in separated localized zones therebetween, and applying index markings along the tape concurrently with the sealing and in predetermined positions in relation to the seals lengthwise of the tape.

References Cited by the Examiner

UNITED STATES PATENTS

| | | | |
|---|---|---|---|
| 2,195,740 | 4/40 | Salfisberg | 53—28 |
| 2,372,406 | 3/45 | Treneer | 53—24 X |
| 2,716,607 | 8/55 | Waline | 99—77.1 |
| 2,746,223 | 5/56 | Fischer | 53—180 |
| 2,772,530 | 12/56 | Williams | 53—180 |
| 2,791,324 | 5/57 | Knoop et al. | 99—77.1 |
| 2,949,711 | 8/60 | Vogt | 53—24 |
| 2,974,452 | 3/61 | Vogt | 53—24 |
| 3,000,157 | 9/61 | Ollier et al. | 53—184 |
| 3,053,022 | 9/62 | Vogt | 53—24 X |

FRANK E. BAILEY, *Primary Examiner.*

ABRAHAM WINKELSTEIN, ROBERT A. LEIGHEY, BROMLEY SEELEY, *Examiners.*